United States Patent
Lawrukovich et al.

(10) Patent No.: US 6,520,200 B1
(45) Date of Patent: Feb. 18, 2003

(54) LIQUID/VAPOR SEPARATOR ASSEMBLY FOR FUEL TANK

(75) Inventors: Michael Paul Lawrukovich, Flushing, MI (US); Gary Francis Stack, Fenton, MI (US); Marpessa Randolph, Luxembourg (LU)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/931,063

(22) Filed: Aug. 16, 2001

(51) Int. Cl.[7] .............................................. F16K 24/04
(52) U.S. Cl. ...................................... 137/202; 137/587
(58) Field of Search .................................. 137/202, 587

(56) References Cited

U.S. PATENT DOCUMENTS

| | | | |
|---|---|---|---|
| 3,187,935 A | * | 6/1965 | Lense ......................... 220/86.2 |
| 4,852,761 A | * | 8/1989 | Turner et al. ................ 137/588 |
| 6,336,466 B1 | * | 1/2002 | Ganachaud et al. ......... 137/202 |
| 2002/0011265 A1 | * | 1/2002 | Ganachaud ................... 137/43 |
| 2002/0121300 A1 | * | 9/2002 | Ehrman et al. .............. 137/202 |

* cited by examiner

Primary Examiner—Gerald A. Michalsky
(74) Attorney, Agent, or Firm—Vincent A. Cichosz

(57) ABSTRACT

A liquid/vapor separator assembly for a fuel tank of a vehicle includes a liquid separator plate adapted to be disposed within and secured to a portion of the fuel tank to form a liquid trap therebetween. The liquid/vapor separator assembly also includes a standpipe extending from the liquid separator plate and communicating with the liquid trap to allow fuel vapors to flow to a vapor canister. The liquid/vapor separator assembly further includes at least one valve mounted to the liquid separator plate to allow fuel from the liquid trap to return to an interior chamber of the fuel tank.

20 Claims, 1 Drawing Sheet

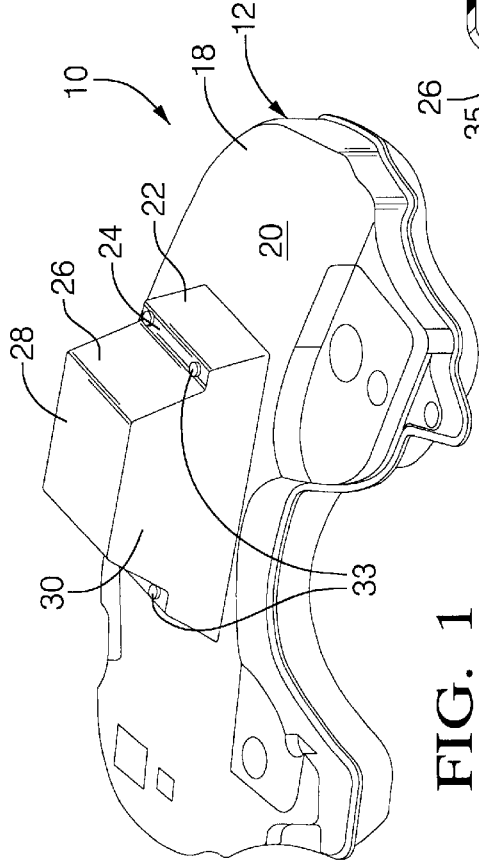
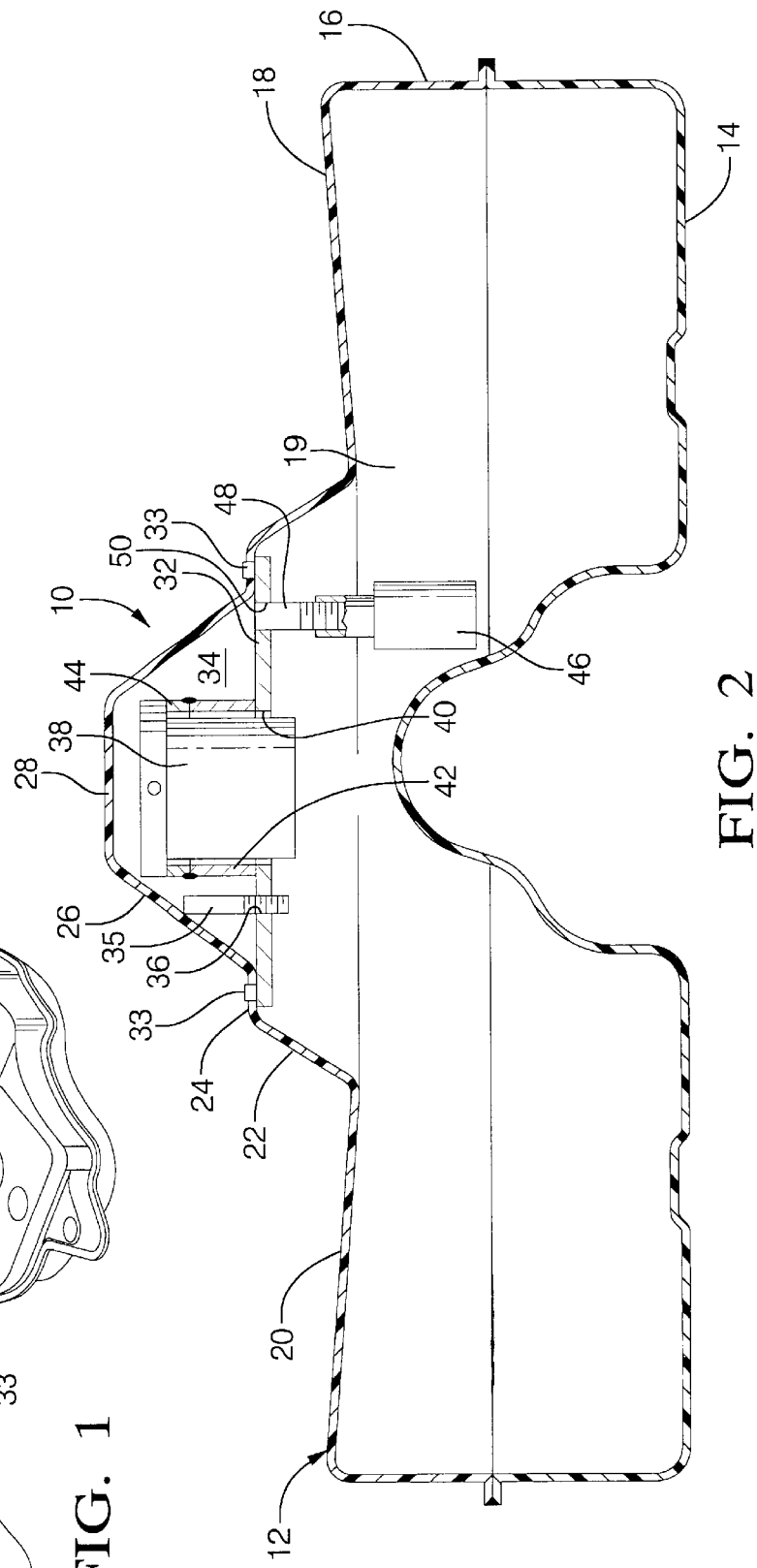

LIQUID/VAPOR SEPARATOR ASSEMBLY FOR FUEL TANK

TECHNICAL FIELD

The present invention relates generally to fuel tanks for vehicles and, more particularly, to a liquid/vapor separator assembly for a fuel tank of a vehicle.

BACKGROUND OF THE INVENTION

It is known to provide a fuel tank in a vehicle to hold fuel to be used by an engine of the vehicle. In such a fuel tank, valves and lines of a vent system are typically mounted externally to the fuel tank. To meet lower emission requirements, it is desirable to mount the valves and lines of the vent system inside the fuel tank. However, liquid fuel needs to be kept out of a vapor canister of the vent system to maintain effective fuel vapor storage of the canister.

Therefore, it is desirable to provide a liquid/vapor separator for a fuel tank in a vehicle that separates fuel vapor from liquid fuel. It is also desirable to provide a liquid/vapor separator for a fuel tank that reduces cost and tooling with minimal complexity.

SUMMARY OF THE INVENTION

It is, therefore, one object of the present invention to provide a liquid/vapor separator assembly for a fuel tank of a vehicle.

It is another object of the present invention to provide a liquid/vapor separator assembly for a fuel tank that eliminates components and connections through integration.

To achieve the foregoing objects, the present invention is a liquid/vapor separator assembly for a fuel tank of a vehicle including a liquid separator plate adapted to be disposed within and secured to a portion of the fuel tank to form a liquid trap. The liquid/vapor separator assembly also includes a standpipe extending from the liquid separator plate and communicating with the liquid trap to allow fuel vapors to flow to a vapor canister. The liquid/vapor separator assembly further includes at least one valve mounted to the liquid separator plate to allow fuel from the liquid trap to return to an interior chamber of the fuel tank.

One advantage of the present invention is that a liquid/vapor separator assembly is provided for a fuel tank of a vehicle, which includes a liquid separator plate welded to the fuel tank to form an integral liquid/vapor separator. Another advantage of the present invention is that the liquid/vapor separator assembly has a liquid separator plate that integrates a fuel limit vent valve, grade vent valve, standpipe, and connection to a vapor canister including the mounting and/or brackets of these components. Yet another advantage of the present invention is that the liquid/vapor separator assembly has a liquid separator plate that includes shape/drain channels to drain liquid fuel. Still another advantage of the present invention is that the liquid/vapor separator assembly improves packaging of the components. A further advantage of the present invention is that the liquid/vapor separator assembly reduces cost and tooling due to the elimination of components and connections through integration.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a liquid/vapor separator assembly, according to the present invention, illustrated in operational relationship with a fuel tank.

FIG. 2 is a fragmentary elevational view of the liquid/vapor separator assembly and fuel tank of FIG. 1.

DESCRIPTION OF THE PREFERRED EMBODIMENT

Referring to the drawings and in particular FIGS. 1 and 2, one embodiment of a liquid/vapor separator assembly 10, according to the present invention, is shown for a fuel tank 12 of a vehicle (not shown). The fuel tank 12 includes a bottom wall 14 and a side wall 16 around a periphery of the bottom wall 14 and extending generally perpendicular thereto. The fuel tank 12 also includes a top wall 18 around a periphery of the side wall 16 and extending generally perpendicular thereto and generally parallel to the bottom wall 14 to form an interior chamber 19 to hold fuel therein. The fuel tank 12 is made of a rigid material such as plastic. It should be appreciated that fuel tank 12 is formed from two half shells that are welded together as is known in the art.

The top wall 18 has a first base portion 20 extending toward the bottom wall 14 and a first side portion 22 extending upwardly and away at an angle from the first base portion 20. The top wall 18 also has a second base portion 24 extending from the first side portion 22 and generally parallel to the bottom wall 14. The top wall 18 further has a second side portion 26 extending upwardly and away at an angle from the second base portion 24. The top wall 18 has a third base portion 28 extending from the second side portion 26 and generally parallel to bottom wall 14. The top wall 18 also has a third side portion 30 extending upwardly from the base portion 20 and enclosing opposed sides of the portions 22, 24, 26, 28. The top wall 18 is integral, unitary, and one-piece. It should be appreciated that the liquid/vapor separator assembly 10 uses the top wall 18 to form a part of the liquid/vapor separator.

Referring to FIGS. 1 and 2, the liquid/vapor separator assembly 10, according to the present invention, includes a liquid separator plate 32 attached to the top wall 18. The liquid separator plate 32 is generally rectangular in shape and of a size to be attached to the second base portion 24 of the top wall 18 by suitable means such as welding to form an integral liquid/vapor separator. The liquid separator plate 32 includes at least one, preferably a plurality of locators or projections 33 extending therefrom and through corresponding apertures in the second base portion 24 to locate the liquid separator plate 32 relative to the top wall 18. The liquid separator plate 32 includes at least one, preferably a plurality of drain apertures or channels (not shown) extending therethrough for liquid fuel to drain therethrough. The liquid separator plate 32 is made from a plastic material such as polyethylene, preferably a high-density polyethylene (HDPE), which is a conventional material known in the art. It should be appreciated that, when the liquid separator plate 32 is attached to the top wall 18 of the fuel tank 12, an integral liquid/vapor separator is formed. It should also be appreciated that, when the liquid separator plate 32 is attached to the top wall 18, a liquid trap 34 is formed between the liquid separator plate 32 and portions 26, 28, 30 of the top wall 18.

The liquid/vapor separator assembly 10 also includes a fuel vapor tube or standpipe 35 extending through an aperture 36 in the liquid separator plate 32. The standpipe 35 is a tubular member with a generally circular cross-sectional shape and fluidly communicates with the liquid trap 34. The standpipe 35 allows fuel vapors that are separated to flow from the liquid trap 34 to a vapor canister (not shown) via a vent line connection to the canister attached to a lower end of the standpipe 35. It should be appreciated that an upper end of the standpipe 35 extends a predetermined distance above the liquid separator plate 32 to prevent liquid fuel from flowing to the vapor canister.

The liquid/vapor separator assembly 10 also includes at least one valve 38, 40 mounted to the liquid separator plate 32. Preferably, the liquid/vapor separator assembly 10 includes a grade vent valve 38 mounted to the liquid separator plate 32. The grade vent valve 38 extends through a central aperture 40 in the liquid separator plate 32. The liquid/vapor separator assembly 10 includes a cylinder 42 disposed about the grade vent valve 38 and aperture 40 and secured to the liquid separator plate 32 by suitable means such as welding. The grade vent valve 38 has an annular flange 44 extending downwardly and attached to the cylinder 42 by suitable means such as welding. It should be appreciated that the cylinder 42 acts as a splash shield for liquid fuel.

Preferably, the liquid/vapor separator assembly 10 includes a fuel limiting vent valve 46 mounted to the liquid separator plate 32. The fuel limiting vent valve 46 is disposed in the interior chamber 19 and suspended by the liquid separator plate 32 via a connector 48 or connected directly to the liquid separator plate 32. The connector 48 extends through an aperture 50 in the liquid separator plate 32 to allow liquid fuel in the liquid trap 34 to drain through the connector 48 and fuel limiting vent valve 46 to the interior chamber 19 of the fuel tank 12. It should be appreciated that the liquid separator plate 32 integrates or incorporates mounting of the fuel limiting vent valve 46, grade vent valve 38, and standpipe 35 to separate liquid fuel. It should also be appreciated that the liquid separator plate 32 acts as a mounting bracket for the fuel limiting vent valve 46 and grade vent valve 38. It should further be appreciated that the valves 38 and 46 are conventional and known in the art.

In operation, liquid fuel is disposed in the interior chamber 19 of the fuel tank 12. When the vehicle is operated, fuel may move and the liquid separator plate 32 separates liquid fuel from fuel vapor in the interior chamber 19. If liquid fuel condenses or is disposed in the liquid trap 34, the liquid fuel drains through the fuel limiting vent valve 46 or evaporates and goes to the vapor canister through the standpipe 34.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A liquid/vapor separator assembly for a fuel tank of a vehicle comprising:
    a liquid separator plate adapted to be disposed within and secured to a top wall of the fuel tank to form a liquid trap between said liquid separator plate and the top wall;
    a standpipe extending from said liquid separator plate and communicating with said liquid trap to allow fuel vapors to flow to a vapor canister; and
    at least one valve mounted to said liquid separator plate.

2. A liquid/vapor separator assembly as set forth in claim 1 wherein said at least one valve comprises a fuel limiting vent valve disposed in the interior chamber of the fuel tank and a connector interconnecting said fuel limiting vent valve and said liquid separator plate.

3. A liquid/vapor separator assembly as set forth in claim 1 wherein said liquid separator plate has an aperture extending therethrough.

4. A liquid/vapor separator assembly as set forth in claim 1 wherein including an aperture extending through said liquid separator plate, said standpipe extending through said aperture.

5. A liquid/vapor separator assembly as set forth in claim 1 wherein the portion of the fuel tank comprises a top wall.

6. A liquid/vapor separator assembly as set forth in claim 5 wherein the top wall has a first base portion, a first side portion extending upwardly from the first base portion, and a second base portion extending from the first side portion.

7. A liquid/vapor separator assembly as set forth in claim 1 wherein said liquid separator plate is generally rectangular in shape.

8. A liquid/vapor separator assembly for a fuel tank of a vehicle comprising:
    a liquid separator plate adapted to be disposed within and secured to a portion of the fuel tank to form a liquid trap;
    a standpipe extending from said liquid separator plate and communicating with said liquid trap to allow fuel vapors to flow to a vapor canister;
    at least one valve mounted to said liquid separator plate;
    said liquid separator plate having an aperture extending therethrough; and
    wherein said at least one valve comprises a grade vent valve disposed in said liquid trap and extending into said aperture.

9. A liquid/vapor separator assembly as set forth in claim 8 including a cylinder disposed about said grade vent valve and said aperture and secured to said liquid separator plate and said grade vent valve.

10. A liquid/vapor separator assembly for a fuel tank of a vehicle comprising:
    a liquid separator plate adapted to be disposed within and secured to a portion of the fuel tank to form a liquid trap;
    a standpipe extending from said liquid separator plate and communicating with said liquid trap to allow fuel vapors to flow to a vapor canister;
    at least one valve mounted to said liquid separator plate;
    wherein the portion of the fuel tank comprises a top wall, wherein the top wall has a first base portion, a first side portion extending upwardly from the first base portion, and a second base portion extending from the first side portion; and
    welds for securing said liquid separator plate to the second base portion.

11. A liquid/vapor separator assembly for a fuel tank of a vehicle comprising:
    a liquid separator plate adapted to be disposed within and secured to a portion of the fuel tank to form a liquid trap;
    a standpipe extending from said liquid separator plate and communicating with said liquid trap to allow fuel vapors to flow to a vapor canister;
    at least one valve mounted to said liquid separator plate;
    wherein the portion of the fuel tank comprises a top wall, wherein the top wall has a first base portion, a first side portion extending upwardly from the first base portion, and a second base portion extending from the first side portion; and
    wherein said liquid trap is formed by a second side portion extending upwardly from the second base portion, a third base portion extending from the second side portion, a side wall portion on opposed sides of the second side portion and third base portion, and said liquid separator plate.

12. A fuel tank assembly for a vehicle comprising:
a fuel tank having a bottom wall, side wall, and a top wall forming an interior chamber;
a liquid separator plate disposed within said interior chamber and welded to said top wall of said fuel tank to form a liquid trap therebetween;
a standpipe extending from said liquid separator plate and communicating with said liquid trap to allow fuel vapors to flow to a vapor canister; and
at least one valve mounted to said liquid separator plate.

13. A fuel tank assembly as set forth in claim 12 wherein said top wall has a first base portion, a first side portion extending upwardly from said first base portion, and a second base portion extending from said first side portion.

14. A fuel tank assembly as set forth in claim 12 wherein said at least one valve comprises a fuel limiting vent valve disposed in said interior chamber of said fuel tank and a connector interconnecting said fuel limiting vent valve and said liquid separator plate to allow liquid fuel to drain through said fuel limiting vent valve to said interior chamber.

15. A fuel tank assembly as set forth in claim 12 wherein said liquid separator plate has an aperture extending therethrough.

16. A fuel tank assembly for a vehicle comprising:
a fuel tank having a bottom wall, side wall, and a top wall forming an interior chamber;
a liquid separator plate disposed within said interior chamber and secured to a portion of said top wall of said fuel tank to form a liquid trap therebetween;
a standpipe extending from said liquid separator plate and communicating with said liquid trap to allow fuel vapors to flow to a vapor canister;
at least one valve mounted to said liquid separator plate;
wherein said top wall has a first base portion, a first side portion extending upwardly from said first base portion, and a second base portion extending from said first side portion; and
welds for securing said liquid separator plate to said second base portion.

17. A fuel tank assembly for a vehicle comprising:
a fuel tank having a bottom wall, side wall, and a top wall forming an interior chamber;
a liquid separator plate disposed within said interior chamber and secured to a portion of said top wall of said fuel tank to form a liquid trap therebetween;
a standpipe extending from said liquid separator plate and communicating with said liquid trap to allow fuel vapors to flow to a vapor canister;
at least one valve mounted to said liquid separator plate;
wherein said liquid separator plate has an aperture extending therethrough; and
wherein said at least one valve comprises a grade vent valve disposed in said liquid trap and extending into said aperture.

18. A fuel tank assembly as set forth in claim 17 including a cylinder disposed about said grade vent valve and said aperture and secured to said liquid separator plate and said grade vent valve.

19. A fuel tank assembly for a vehicle comprising:
a fuel tank having a bottom wall, side wall, and a top wall forming an interior chamber;
a liquid separator plate disposed within said interior chamber and secured to a portion of said top wall of said fuel tank to form a liquid trap therebetween;
a standpipe extending from said liquid separator plate and communicating with said liquid trap to allow fuel vapors to flow to a vapor canister;
at least one valve mounted to said liquid separator plate;
wherein said top wall has a first base portion, a first side portion extending upwardly from said first base portion, and a second base portion extending from said first side portion; and
wherein said top wall includes a second side portion extending upwardly from said second base portion, a third base portion extending from said second side portion, a side wall portion on opposed sides of said second side portion and said third base portion to form said liquid trap with said liquid separator plate.

20. A fuel tank for a vehicle comprising:
a bottom wall, side wall, and a top wall forming an interior chamber;
said top wall having a first base portion, a first side portion extending upwardly from said first base portion, a second base portion extending from said first side wall, a second side portion extending upwardly from said second base portion, a third base portion extending from said second side portion, a side wall portion on opposed sides of said second side portion and said third base portion;
a liquid separator plate disposed within said interior chamber and secured to said second base portion of said top wall to form a liquid trap between said liquid separator plate and said second side portion, said third base portion, and said side wall portion;
a standpipe extending from said liquid separator plate and communicating with said liquid trap to allow fuel vapors to flow to a vapor canister; and
at least one valve mounted to said liquid separator plate.

* * * * *